US009832782B2

(12) United States Patent
Zhu et al.

(10) Patent No.: US 9,832,782 B2
(45) Date of Patent: Nov. 28, 2017

(54) TECHNIQUES AND CONFIGURATIONS ASSOCIATED WITH USER EQUIPMENT-INITIATED CONGESTION REPORTING

(71) Applicant: Intel IP Corporation, Santa Clara, CA (US)

(72) Inventors: Jing Zhu, Portland, OR (US); Yi Gai, Hillsboro, OR (US); Rath Vannithamby, Portland, OR (US)

(73) Assignee: INTEL IP CORPORATION, Santa Clara, CA (US)

(*) Notice: Subject to any disclaimer, the term of this patent is extended or adjusted under 35 U.S.C. 154(b) by 57 days.

(21) Appl. No.: 14/495,704

(22) Filed: Sep. 24, 2014

(65) Prior Publication Data

US 2015/0117187 A1  Apr. 30, 2015

Related U.S. Application Data

(60) Provisional application No. 61/898,425, filed on Oct. 31, 2013.

(51) Int. Cl.
*H04W 72/10* (2009.01)
*H04W 24/10* (2009.01)
(Continued)

(52) U.S. Cl.
CPC .......... *H04W 72/10* (2013.01); *H04B 17/318* (2015.01); *H04J 3/1694* (2013.01); *H04L 5/0007* (2013.01); *H04W 4/003* (2013.01); *H04W 4/008* (2013.01); *H04W 4/02* (2013.01); *H04W 4/023* (2013.01); *H04W 8/005* (2013.01); *H04W 8/06* (2013.01); *H04W 8/183* (2013.01);
(Continued)

(58) Field of Classification Search
CPC ...... H04W 4/003; H04W 48/12; H04L 5/0032
See application file for complete search history.

(56) References Cited

U.S. PATENT DOCUMENTS

2006/0039287 A1   2/2006   Hasegawa et al.
2009/0275343 A1   11/2009  Monnes et al.
(Continued)

FOREIGN PATENT DOCUMENTS

| EP | 2680644 A1 | 1/2014 | |
|----|------------|--------|---|
| KR | EP 2854443 A1 * | 4/2015 | ............ H04W 74/08 |
| WO | 2012114630 A1 | 8/2012 | |

OTHER PUBLICATIONS

International Search Report and Written Opinion of the International Searching Authority for International Patent Application No. PCT/US2014/061498 dated Jan. 23, 2014.
(Continued)

*Primary Examiner* — Michael Thier
*Assistant Examiner* — Zhensheng Zhang
(74) *Attorney, Agent, or Firm* — Schwabe, Williamson & Wyatt, P.C.

(57) ABSTRACT

Embodiments of the present disclosure describe systems and methods for user equipment (UE)-initiated reporting of congestion information. Various embodiments may include systems and methods for reporting congestion information to an evolved node B (eNB) by UEs. In embodiments, the congestion information may be utilized in managing access requests made by the UEs. Other embodiments may be described and/or claimed.

14 Claims, 4 Drawing Sheets

(51) Int. Cl.

| | | |
|---|---|---|
| H04W 48/06 | (2009.01) | |
| H04W 74/00 | (2009.01) | |
| H04W 72/04 | (2009.01) | |
| H04W 76/02 | (2009.01) | |
| H04W 48/08 | (2009.01) | |
| H04W 48/18 | (2009.01) | |
| H04W 4/00 | (2009.01) | |
| H04W 28/02 | (2009.01) | |
| H04W 48/12 | (2009.01) | |
| H04W 36/00 | (2009.01) | |
| H04W 4/02 | (2009.01) | |
| H04W 8/00 | (2009.01) | |
| H04W 52/34 | (2009.01) | |
| H04W 56/00 | (2009.01) | |
| H04B 17/318 | (2015.01) | |
| H04W 74/08 | (2009.01) | |
| H04W 72/08 | (2009.01) | |
| H04W 8/06 | (2009.01) | |
| H04W 8/18 | (2009.01) | |
| H04W 60/00 | (2009.01) | |
| H04W 60/02 | (2009.01) | |
| H04J 3/16 | (2006.01) | |
| H04W 92/20 | (2009.01) | |
| H04W 84/12 | (2009.01) | |
| H04W 88/08 | (2009.01) | |
| H04L 5/00 | (2006.01) | |
| H04W 88/02 | (2009.01) | |
| H04W 88/16 | (2009.01) | |
| H04B 7/0413 | (2017.01) | |
| H04W 8/04 | (2009.01) | |

(52) U.S. Cl.
CPC ....... *H04W 24/10* (2013.01); *H04W 28/0215* (2013.01); *H04W 36/0055* (2013.01); *H04W 48/06* (2013.01); *H04W 48/08* (2013.01); *H04W 48/12* (2013.01); *H04W 48/18* (2013.01); *H04W 52/346* (2013.01); *H04W 56/001* (2013.01); *H04W 56/002* (2013.01); *H04W 60/00* (2013.01); *H04W 60/02* (2013.01); *H04W 72/048* (2013.01); *H04W 72/0453* (2013.01); *H04W 72/0486* (2013.01); *H04W 72/085* (2013.01); *H04W 74/004* (2013.01); *H04W 74/0833* (2013.01); *H04W 76/02* (2013.01); *H04W 76/023* (2013.01); *H04W 76/025* (2013.01); *H04W 76/027* (2013.01); *H04W 76/028* (2013.01); *H04B 7/0413* (2013.01); *H04L 5/001* (2013.01); *H04L 5/0098* (2013.01); *H04W 8/04* (2013.01); *H04W 84/12* (2013.01); *H04W 88/02* (2013.01); *H04W 88/08* (2013.01); *H04W 88/16* (2013.01); *H04W 92/20* (2013.01)

(56) References Cited

U.S. PATENT DOCUMENTS

| | | | |
|---|---|---|---|
| 2011/0267948 A1 | 11/2011 | Koc et al. | |
| 2012/0307634 A1* | 12/2012 | Zhu | H04W 28/0205 370/231 |
| 2013/0039274 A1 | 2/2013 | Lee | |
| 2013/0095879 A1 | 4/2013 | Gupta et al. | |
| 2013/0159548 A1 | 6/2013 | Vasseur et al. | |
| 2013/0242726 A1 | 9/2013 | Zhu et al. | |
| 2013/0242898 A1 | 9/2013 | Johansson et al. | |
| 2015/0201349 A1* | 7/2015 | Lee | H04W 28/0236 370/236 |

OTHER PUBLICATIONS

K. Ramakrishnan et al.; "The Addition of Explicit Congestion Notification (ECN) to IP," Network Working Group; Category; Standards Track; Sep. 2001; 63 pages.

3GPP TS 22.011 V11.3.0 (Mar. 2013); "Technical Specification Group Services and System Aspects; Service accessibility (Release 11)," 26 pages.

3GPP TS 36.331 V11.5.0 (Sep. 2013); "Technical Specification Group Radio Access Network; Evolved Universal Terrestrial Radio Access (E-UTRA); Radio Resource Control (RRC); Protocol specification (Release 11)," 347 pages.

European Patent Office; Extended European Search Report issued for Patent Application No. 14859283.5 dated Jun. 21, 2017; 7 pages.

* cited by examiner

300

-- ASN1START

System InformationBlockType2 :: = SEQUENCE {
ac-BarringInfo SEQUENCE {
ac-BarringForEmergency BOOLEAN,
ac-BarringForMO-Signaling AC-BarringConfig OPTIONAL, -- Need OP
ac-BarringForMO-Data AC-BarringConfig OPTIONAL -- Need OP
} OPTIONAL, -- Need OP
radioResourceConfigCommon RadioResourceConfigCommonSIB,
ue-TimersAndConstants UE-TimersAndConstants,
freqInfo SEQUENCE {
ul-CarrierFreq ARFCN-ValueEUTRA OPTIONAL, -- Need OP
ul-Bandwith ENUMERATED {n6, n15, n25, n50, n75, n100}
OPTIONAL, -- Need OP
additionalSpectrumEmission AdditionalSpectrumEmission
},
mbsfn-SubframeConfigList MBSFN-SubframeConfigList OPTIONAL, Need OR
timeAlignmentTimerCommon TimeAlignmentTimer,
...
}

AC-BarringConfig : : = SEQUENCE {
ac-BarringFactor ENUMERATED {
p00, p05, p10, p15, p20, p25, p30, p40,
p50, p60, p70, p75, p80, p85, p90, p95},
ac-BarringTime ENUMERATED {s4, s8, s16, s32, s64, s128, s256, s512},
302 —— ac-BarringForSpecialAC BIT STRING (SIZE(5)),
304 —— ac-BarringFeedback BOOLEAN,
—— ac-BarringCategory INTEGER(0..15),
306 —— ra-AttemptNumber INTEGER(0..15),
308 —— ra-AttemptTime ENUMERATED {s1, s2, s3, s4, s5, s6, s7, s8}
}

MBSFN-SubframeConfigList : : = SEQUENCE (SIZE (1..maxMBSFN-Allocations)) OF
MBSF-SubFrameConfig MBSFN-SubFrameConfig : : = SEQUENCE {
radioframeAllocationPeriod ENUMERATED {n1, n2, n4, n8, n16, n32},
radioframeAllocationOffset INTEGER (0..7),
subframeAllocation CHOICE {
oneFrame BIT STRING (SIZE(6)),
fourFrames BIT STRING (SIZE(24))
}

FIG. 3

TECHNIQUES AND CONFIGURATIONS ASSOCIATED WITH USER EQUIPMENT-INITIATED CONGESTION REPORTING

CROSS-REFERENCE TO RELATED APPLICATION

This application claims the benefit of U.S. Provisional Application No. 61/898,425 filed Oct. 31, 2013, entitled "ADVANCED WIRELESS COMMUNICATION SYSTEMS AND TECHNIQUES," the entirety of which is hereby incorporated by reference.

FIELD

Embodiments of the present disclosure generally relate to the field of wireless communication, and more particularly, to user equipment-initiated congestion reporting.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

When a disaster (e.g. earthquake, tsunami) occurs, a large amount of traffic and signaling load may arrive at a network operator. This may result from people trying to dial 911, call their relatives/friends, send messages/emails, or perform video calls, to report their status and/or ask for help. The network operator may need to efficiently deal with such traffic bursts by recognizing the traffic associated with the emergent situation and providing necessary services to support the public in general. Similar problems may also exist for very large social events (e.g. sport match, new-year event), for which a great amount of traffic can be generated in an abbreviated period of time.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3 is a sample evolved node B (eNB) reporting-support transmission.

DETAILED DESCRIPTION

Figure 1:
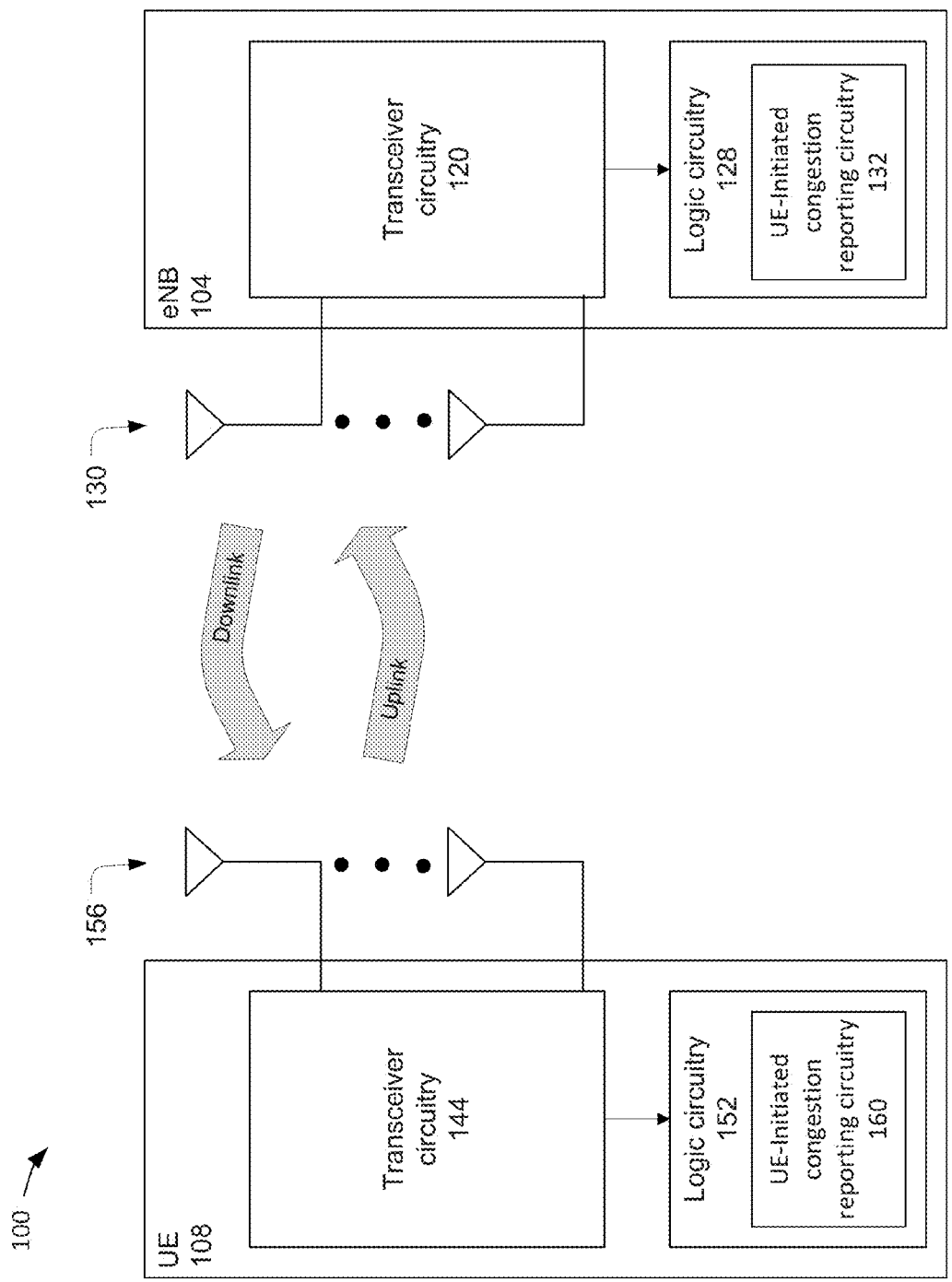
FIG. 1 schematically illustrates a wireless communication environment in accordance with various embodiments of the present disclosure.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

As discussed above, in abnormal circumstances, such as when a disaster occurs or during a very large social event, a large amount of traffic and signaling load may be generated on cellular networks within proximity of the abnormal circumstances. This large amount of traffic may cause the cellular networks to be overloaded, or congested. In such a situation it may be desirable for the cellular networks to respond to the congestion by restricting access attempts from lower priority UEs, that may be non-essential to ensure essential communications (e.g., emergency 911 calls, calls from emergency services, etc.) may be maintained for higher priority UEs. However, in order to accomplish this, the access node may need to know of the congestion in order to be able to respond appropriately.

To acquire information concerning the congestion, the access node (e.g., an evolved node b (eNB)) may request congestion information from the user equipments (UEs) within operational proximity of the access node in order to determine a congestion level of the network. Thus, to acquire congestion information the access node may need to initiate the reporting of congestion information. However, such access node initiated reporting of congestion information may not be very efficient. The access node has little or no information on which UE, of the UEs within operation proximity of the access node, may be experiencing congestion and therefore may need to send the request for congestion information to all UEs connected therewith. The access node also has little or no information on when a UE, of the UEs connected therewith, may experience congestion and therefore needs to send the request for congestion information to the UEs connected therewith periodically. Finally, the access node has no way of defining a trigger, or event, and therefore all UEs report congestion information regardless of whether or not the UE actually experiences any congestion. All of the traffic between the access node and the UEs connected therewith may needlessly utilize resources of the cellular network. As used herein, operational proximity may include a proximity around an access node in which UEs within the proximity may utilize the access node in accessing the cellular network.

In the 3rd Generation Partnership Project (3GPP), the Access Class Barring (ACB) mechanism may be utilized by the access node to allow the access node to control access attempts from UEs over a random access channel (RACH). Access Classes (AC) are defined ranging from 0 to 15, where 0 to 9 are allocated randomly to lower priority UEs, and stored in the subscriber identity module/universal subscriber identity module (SIM/USIM) of the individual UEs. AC 10 is reserved for enhanced-911 (E-911) calls. In addition to AC 0 to 9 for lower priority UEs and AC 10 for E-911 calls, some UEs may be associated with one or more out of 5 special ACs that may be assigned to certain higher priority UEs. These special ACs include: AC 11—for public land mobile network (PLMN) use (e.g., network administrative devices); AC 12—for security services (e.g., police); AC 13—for public utilities (e.g., water, gas, etc.); AC 14—for emergency services (e.g., fire, emergency medical technicians (EMTs), etc.); and AC 15—for PLMN Staff.

Through the broadcast of AC barring parameters, an access node may control the access of UEs to the cellular network. For lower priority UEs, those with AC 0 to 9, access may be controlled by parameters ac-BarringFactor and ac-BarringTime. For such UEs ac-BarringFactor is the probability that a UE passes the "persistent" test. The persistent test is passed if a random number generated by the UE is lower than the ac-BarringFactor. Otherwise the access is barred, and the ac-BarringTime indicates how long the UE will be barred in seconds. For UEs with AC 10, access may be controlled by ac-BarringForEmergency, which may be a boolean value to indicate barring or not. For UEs with AC 11-15, access is controlled by ac-BarringForSpecialAC, which is a boolean vector (of size 5) to indicate barring or not for each of ACs 11-15. However, it may be difficult to configure the optimal value of ac-BarringFactor because the access node may not have enough information to determine the network congestion level on RACH.

A more efficient manner of responding to cellular network congestion and/or configuring of ac-BarringFactor, however, may be to configure the access node and the UE's within operational proximity thereof, to support UE-initiated reporting of congestion information. This may enable a UE that experiences one or more pre-defined, or configured, congestion events to automatically report congestion information to the access node, once the UE successfully establishes a connection with the access node. This reporting may be accomplished without the need for the access node to request such congestion information. The access node may then analyze the congestion information to enable the access node to manage access attempts from the UEs within operation proximity thereof.

FIG. 1 schematically illustrates a wireless communication environment 100 in accordance with various embodiments. The environment 100 may include a user equipment (UE) 108 in wireless communication with an access node such as evolved node B (eNB) 104. The eNB 104 may be part of a 3rd Generation Partnership Project (3GPP) long-term evolution (LTE) network (or an LTE-Advanced (LTE-A) network). In particular, the eNB 104 may be part of a radio access network (RAN) of the LTE/LTE-A network, such as an evolved universal terrestrial radio access network (E-UTRAN). The E-UTRAN may be coupled with a core network such as an Evolved Packet Core (EPC) that performs various management and control functions of the LTE/LTE-A network and further provides a communication interface between various RANs and other networks.

eNB 104 may include transceiver circuitry 120 with which to receive uplink transmissions from UE 108 via one or more antennas 130 and transmit downlink transmissions to UE 108 via the one or more antennas 130. eNB 104 may also include logic circuitry 128 coupled with transceiver circuitry 120. In embodiments logic circuitry 128 may be configured to decode and encode information transmitted in signals communicated between UE 108 and eNB 104. Logic circuitry 128 may further be configured by UE-initiated congestion reporting circuitry 132 to perform any portion of the processes for UE-initiated congestion reporting described below.

UE 108 may include transceiver circuitry 144, logic circuitry 152, and one or more antennas 156. Transceiver circuitry 144 may be coupled with the one or more antennas 156 to receive downlink transmission from eNB 104 and transmit uplink transmissions to eNB 104. Logic circuitry 152 may be coupled to transceiver circuitry 144, and may be configured to decode and encode information transmitted in signals communicated between the UE 108 and the eNB 104. Logic circuitry 152 may further be configured by UE-initiated congestion reporting circuitry 160 to perform any portion of the processes for UE-initiated congestion reporting described below.

Figure 2:
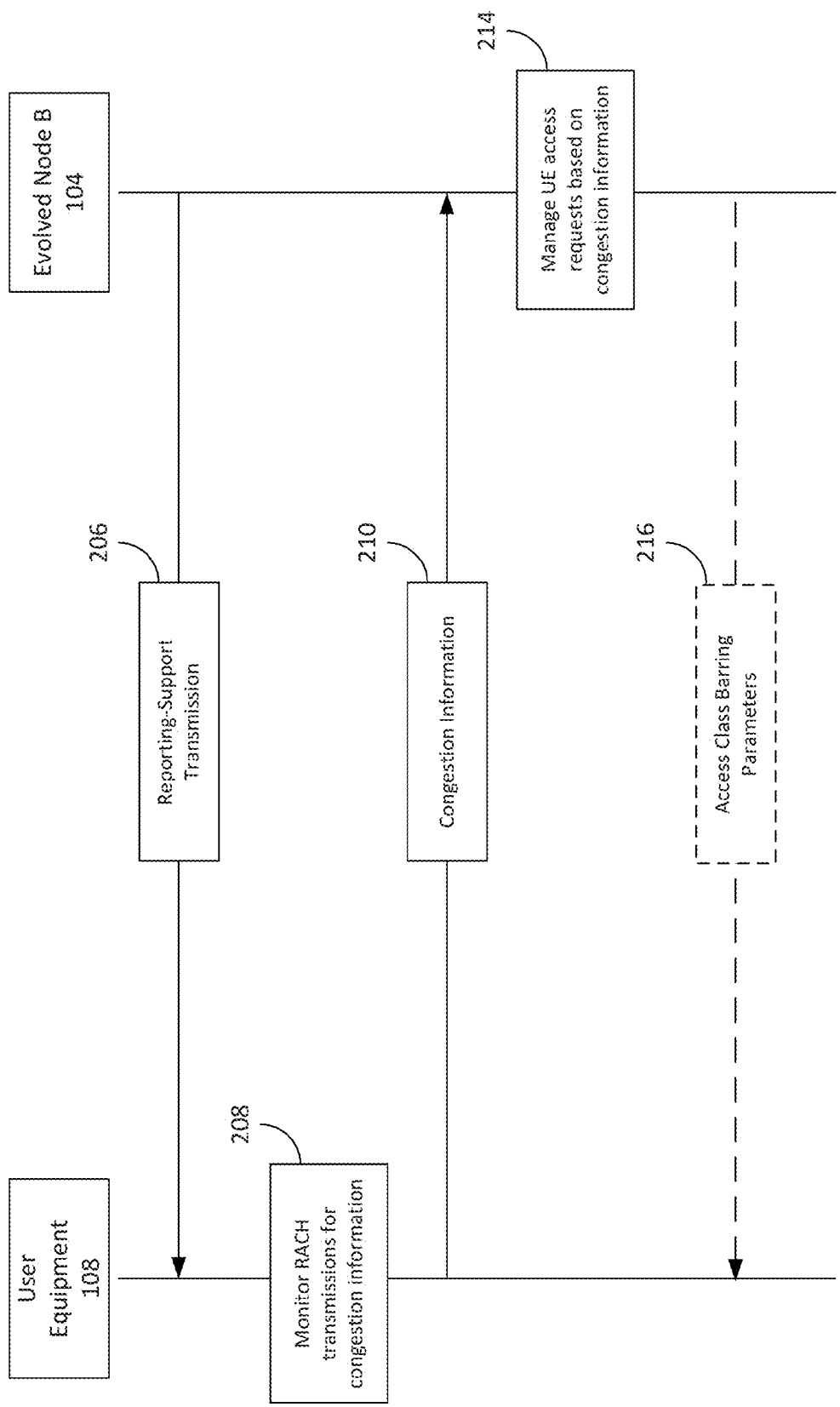
FIG. 2 is a flowchart illustrating user equipment (UE)-initiated congestion reporting in accordance with various embodiments of the present disclosure.

FIG. 2 is a flowchart illustrating user equipment (UE)-initiated congestion reporting in accordance with various embodiments of the present disclosure. As depicted, the flowchart may begin where evolved node B (eNB) 104 may send a reporting-support transmission 206 to user equipment 108. In some embodiments, reporting-support transmission 206 may be transmitted by eNB 104 as part of a broadcast control message, such as the system information block 2 (SIB2) transmission 300 described below in reference to FIG. 3. In other embodiments, reporting-support transmission may be transmitted by eNB 104 in a radio resource control (RRC) message. It will be appreciated that the above mentioned mechanisms for transmitting reporting-support transmission are meant to be illustrative of possible transmission mechanisms and are not meant to be limiting of the present disclosure. Any suitable mechanism of transmitting the reporting-support transmission is contemplated.

In some embodiments, reporting-support transmission 206 may merely include a Boolean reporting parameter to indicate whether or not eNB 104 supports UE-initiated reporting of congestion information. In other embodiments, reporting-support transmission 206 may include one or more additional parameters that define one or more congestion events. These congestion events may be events that are indicative of a threshold level of congestion in a cellular network. In embodiments, the one or more congestion events may include a threshold number of unsuccessful connection attempts or a threshold duration of unsuccessful connection attempts. In some embodiments, the one or more additional parameters may define congestion events that vary based on an access class to which a UE may belong. For example, if UE 108 is assigned to one of ACs 0-9, the threshold for network congestion may be higher (e.g., as depicted by the higher attempt number for ACs 0-9 in Table 2 below) than if UE 108 is assigned to one of the special classes, ACs 11-15. In still other embodiments, the reporting-support transmission may include a congestion information format to indicate to UE 108 how to format congestion information that is sent to eNB 104.

In response to receiving the reporting-support transmission, at block 208 UE 108 may begin monitoring random access channel (RACH) transmissions for congestion information. These RACH transmissions may be sent as part of a random access procedure for RRC connection establishment. Access class barring, discussed elsewhere herein, is a concept of RRC connection establishment. In embodiments where reporting-support transmission 206 does not include a definition of congestion events, UE 108 may, in some embodiments, be configured to transmit congestion information 210 upon every successful connection established with eNB 104. In other embodiments, UE 108 may be preconfigured with one or more congestion events and may be configured to only report congestion information 210 upon the occurrence of one of these one or more congestion events. In still other embodiments, as discussed above, reporting-support transmission 206 may include one or more additional parameters that may define the one or more congestion events to be utilized by UE 108. In such embodiments, UE 108 may be configured to only report congestion information 210 upon the occurrence of one of the one or more congestion events defined by the one or more additional parameters of reporting-support transmission 206.

As mentioned above, the one or more congestion events may include any events that may be indicative of a threshold level of congestion in a cellular network. For example, in some embodiments, the one or more congestion events may include a threshold number of unsuccessful attempts to connect with eNB 104 after which UE 108 is to report congestion information 210 once a successful connection is established with eNB 104. In some embodiments, the one or more congestion events may include a threshold duration of unsuccessful attempts to connect with the eNB 104 after which UE 108 is to report congestion information 210 once a successful connection is established with eNB 104.

In embodiments, the UE 108 may initiate reporting of congestion information 210 upon successfully establishing a connection with eNB 104. Congestion information 210 may include a Boolean indicator indicative of whether one of the one or more congestion events was detected by UE 108. Congestion information 210 may, in some embodiments, include an AC identifier that identifies an AC to which UE 108 belongs. In some embodiments, congestion information 210 may include a numerical indicator indicating a number of consecutive unsuccessful attempts by the respective UE to connect with the eNB and/or or a time indicator indicating a duration of consecutive unsuccessful attempts by the respective UE to connect with the eNB. It will be appreciated that the above discussed contents of congestion information 210 are meant to be illustrative of possible content and are not meant to be limiting of the present disclosure. Any congestion information that may convey a level of network congestion to eNB 104 is contemplated.

In embodiments, congestion information 210 may be transmitted to eNB 104 as a reserved bit of a medium access control (MAC) header configured to indicate whether or not a congestion event was detected. In other embodiments congestion information 210 may be transmitted to eNB 104 as part of a MAC control element. In such embodiments, the MAC control element may be identified by a logical channel identifier (LCID). It will be appreciated that the above mentioned mechanisms for transmitting congestion information 210 are meant to be illustrative of possible transmission mechanisms and are not meant to be limiting of the present disclosure. Any suitable mechanism of transmitting the congestion information 210 to eNB 104 is contemplated.

After receiving congestion information 210, eNB 104 may utilize congestion information 210 in managing access requests received from UE 108, as well as any other UEs that may submit access requests to eNB 104. In some embodiments, this may involve dynamically adjusting the AC barring parameters (e.g., ac-BarringFactor) based on congestion information 210, as well as any congestion information received from other UEs, to control access requests received by eNB 104. For example, if eNB 104 receives congestion information from a UE associated with AC 10, eNB 104 may prioritize E-911 calls by reducing the value of ac-BarringFactor for UEs with an AC of 0-9. In embodiments, the dynamically adjusted AC barring parameters may then be sent to UE 108, as well as any other UE's within operational proximity of eNB 104.

In some embodiments, reporting-support transmission 206, discussed above, may include a vector indicating ac-BarringCategories associated with possible AC values, such as those depicted in table 1, below. In such embodiments, the ac-BarringCategory may determine an order of priority with respect to dynamically adjusting the AC barring parameters. As depicted in table 1, ACs 0-9 are associated with the lowest priority of 0, while AC 10 is a higher priority of 1, and ACs 11-15 are yet a higher priority of 2.

TABLE 1

Example AC-BarringCategories

| ac-BarringCategory | AC |
|---|---|
| 0 | 0-9 |
| 1 | 10 |
| 2 | 11-15 |

While depicted in FIG. 2 as an interaction between an eNB and a single UE, it will be appreciated that any number of UEs within operational proximity to eNB 104 may follow the process flow described herein.

FIG. 3 is a sample evolved node B (eNB) reporting-support transmission 300. Such a transmission may be transmitted as part of a system information block 2 (SIB2) transmission, as depicted, or as part of a radio resource control (RRC) transmission. The reporting support transmission 300 may include one or more parameters, such as parameters 302-308. As depicted, parameter 302 may be labeled ac-BarringFeedback, and may be a Boolean value indicating support of the eNB for UE-initiated congestion reporting and/or support for dynamic adjustment of an ac-BarringFactor.

Parameter 304 may be labeled ac-BarringCategories which may be a vector of integers of size 16, one for each possible AC, defining the ac-BarringCategories. In such a data structure, the location of a value in the vector may correlate that value with an AC. For example, table 1, above, may be expressed in a vector representation as (0, 0, 0, 0, 0, 0, 0, 0, 0, 0, 1, 2, 2, 2, 2, 2) where each location of the vector may correspond with an AC. As discussed above, the ac-BarringCategory may define an order of priority with respect to dynamically adjusting the AC barring parameters for each AC 0-15.

Parameter 306 may be labeled ra-AttemptNumber which may be a vector of integers of size 16, one for each possible AC. The ra-AttemptNumber may define a number of attempts a UE may need to make before a congestion event occurs. As with ac-BarringCategories above, in such a data structure, the location of a value in the vector may correlate that value with an AC. To save resources, a pre-defined table, such as Table 2, below, may be used as a static mapping between AC values and ra-AttemptNumber or ra-AttemptTime, ra-AttemptTime is discussed further below.

TABLE 2 an example of a pre-defined table to indicate AttemptNumber

| AC | AttemptNumber |
|---|---|
| 0-9 | 3 |
| 10 | 1 |
| 11 | 2 |
| 12 | 1 |
| 13 | 1 |
| 14 | 1 |
| 15 | 2 |

Parameter 308 may be labeled ra-AttemptTime which may be a vector of enumerated values of size 16, one for each possible AC. The ra-AttemptTime may define a duration of consecutive unsuccessful connection attempts a UE may need to make before a congestion event occurs. As with ac-BarringCategories and ra-AttemptNumber above, in such a data structure, the location of a value in the vector may correlate that value with an AC.

Figure 4:
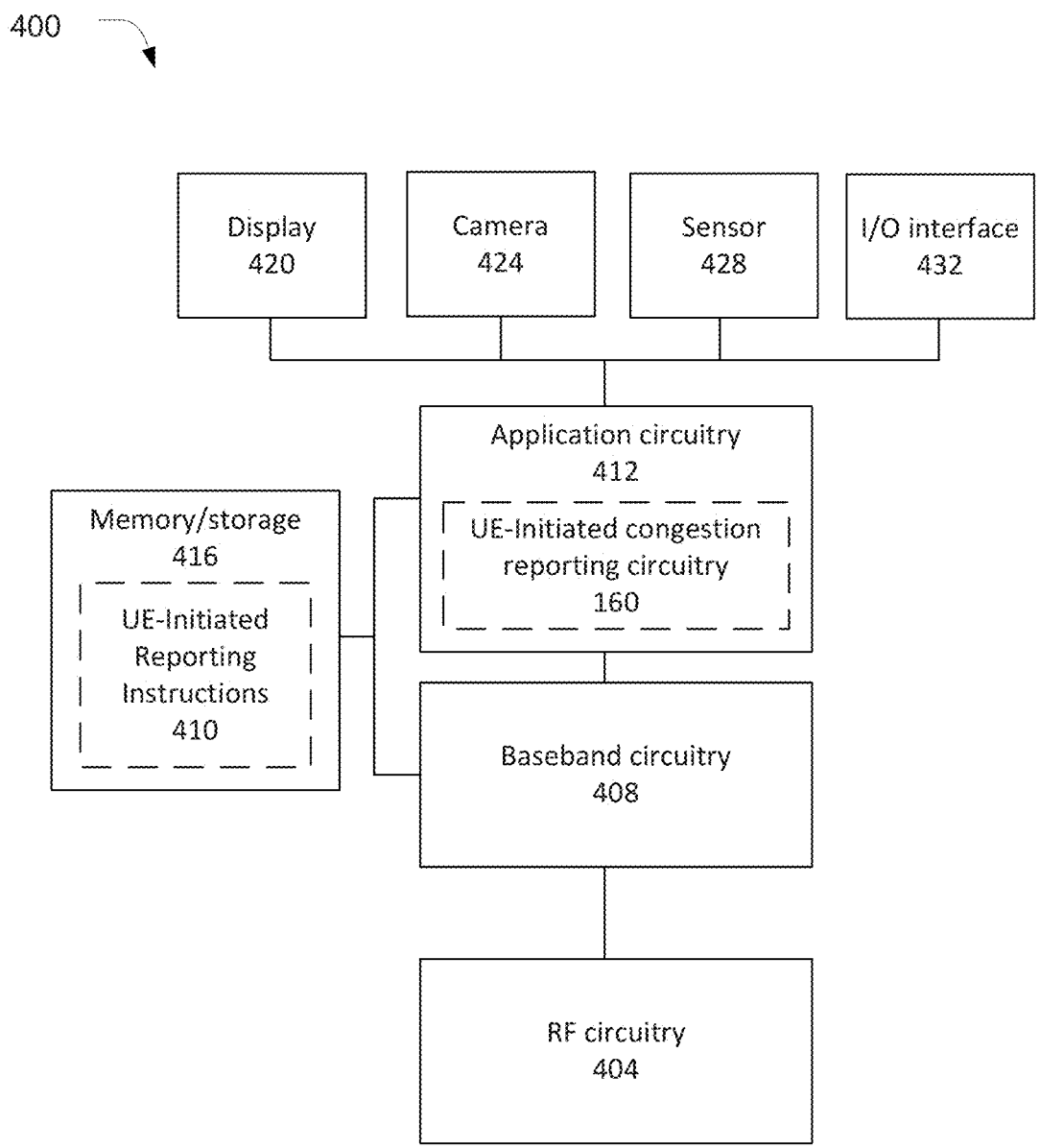
FIG. 4 is a block diagram of an example computing device that may be used to practice various embodiments described herein.

The UE 108 as described herein may be implemented into a system using any suitable hardware, firmware, and/or software configured as desired. FIG. 4 illustrates, for one embodiment, an example system 400 comprising radio frequency (RF) circuitry 404, baseband circuitry 408, application circuitry 412, memory/storage 416, display 420, camera 424, sensor 428, and input/output (I/O) interface 432, coupled with each other at least as shown.

The application circuitry 412 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 416 and configured to execute instructions stored in the memory/storage 416 to enable various applications and/or operating systems running on the system 400.

The baseband circuitry 408 may include circuitry such as, but not limited to, one or more single-core or multi-core processors. The processor(s) may include a baseband processor. The baseband circuitry 408 may handle various radio control functions that enable communication with one or more radio networks via the RF circuitry 404. The radio control functions may include, but are not limited to, signal modulation, encoding, decoding, radio frequency shifting, etc. In some embodiments, the baseband circuitry 408 may provide for communication compatible with one or more radio technologies. For example, in some embodiments, the baseband circuitry 408 may support communication with an E-UTRAN and/or other wireless metropolitan area networks (WMAN), a wireless local area network (WLAN), or a wireless personal area network (WPAN). Embodiments in which the baseband circuitry 408 is configured to support radio communications of more than one wireless protocol may be referred to as multi-mode baseband circuitry.

In various embodiments, baseband circuitry 408 may include circuitry to operate with signals that are not strictly considered as being in a baseband frequency. For example, in some embodiments, baseband circuitry 408 may include circuitry to operate with signals having an intermediate frequency, which is between a baseband frequency and a radio frequency.

In some embodiments, the transceiver circuitry 112 and/or the UE-initiated congestion reporting circuitry 160 may be embodied in the application circuitry 412 and/or the baseband circuitry 408.

RF circuitry 404 may enable communication with wireless networks using modulated electromagnetic radiation through a non-solid medium. In various embodiments, the RF circuitry 404 may include switches, filters, amplifiers, etc., to facilitate the communication with the wireless network.

In various embodiments, RF circuitry 404 may include circuitry to operate with signals that are not strictly considered as being in a radio frequency. For example, in some embodiments, RF circuitry 404 may include circuitry to operate with signals having an intermediate frequency, which is between a baseband frequency and a radio frequency.

In some embodiments, the wireless transceiver 144 may be embodied in the RF circuitry 404.

In some embodiments, some or all of the constituent components of the baseband circuitry 408, the application circuitry 412, and/or the memory/storage 416 may be implemented together on a system on a chip (SOC).

Memory/storage 416 may be used to load and store data and/or instructions, for example UE-initiated reporting instructions 410 which may be configured to cause system 400 to carry out any portion of the UE-initiated congestion reporting process discussed herein. Memory/storage 416 for one embodiment may include any combination of suitable volatile memory (e.g., dynamic random access memory (DRAM)) and/or non-volatile memory (e.g., Flash memory).

In various embodiments, the I/O interface 432 may include one or more user interfaces designed to enable user interaction with the system 400 and/or peripheral component interfaces designed to enable peripheral component interaction with the system 400. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 428 may include one or more sensing devices to determine environmental conditions and/or location information related to the system 400. In some embodiments, the sensors may include, but are not limited to, a gyro sensor, an accelerometer, a proximity sensor, an ambient light sensor, and a positioning unit. The positioning unit may also be part of, or interact with, the baseband circuitry 408 and/or RF circuitry 404 to communicate with components of a positioning network, e.g., a global positioning system (GPS) satellite.

In various embodiments, the display 420 may include a display (e.g., a liquid crystal display, a touch screen display, etc.).

In various embodiments, the system 400 may be a mobile computing device such as, but not limited to, a laptop computing device, a tablet computing device, a netbook, an ultrabook, a smartphone, etc. In various embodiments, system 400 may have more or fewer components, and/or different architectures.

EXAMPLES

The following paragraphs describe examples of various embodiments.

Example 1 may include a user equipment (UE) comprising: transceiver circuitry to send a random access channel (RACH) transmission to an evolved node B (eNB) in an attempt to connect with the eNB; and logic circuitry coupled with the transceiver circuitry, the logic circuitry to: monitor RACH transmissions from the UE to the eNB to detect one or more congestion events associated with attempts by the UE to connect with the eNB; and initiate, in response to detection of at least one of the one or more congestion events, reporting of congestion information to the eNB via the transceiver circuitry upon a successful connection with the eNB.

Example 2 may include the subject matter of Example 1, wherein the transceiver circuitry is further to receive, from the eNB, a reporting-support transmission including a reporting parameter that indicates the eNB supports UE-initiated reporting of congestion information, and wherein the logic circuitry is to initiate reporting of the congestion information only upon receipt of the reporting parameter.

Example 3 may include the subject matter of Example 2, wherein the reporting-support transmission further includes one or more additional parameters that define the one or more congestion events.

Example 4 may include the subject matter of Example 3, wherein the one or more congestion events include a threshold number of unsuccessful connection attempts by the UE or a threshold duration of unsuccessful connection attempts by the UE.

Example 5 may include the subject matter of Example 4, wherein the reporting-support transmission is received as part of: a broadcast control message transmitted by the eNB; or a radio resource control (RRC) message transmitted by the eNB.

Example 6 may include the subject matter of any one of Examples 2-5, wherein the congestion information includes one or more of: a boolean indicator that at least one of the one or more congestion events was detected; an access class identifier that identifies an access class to which the UE belongs; a numerical indicator indicating a number of consecutive unsuccessful attempts to connect with the eNB; or a time indicator indicating a duration of consecutive unsuccessful attempts to connect with the eNB.

Example 7 may include the subject matter of Example 6, wherein the transceiver circuitry is further to report the congestion information via an uplink transmission including: a medium access control (MAC) header that includes the congestion information; or a MAC control element that includes the congestion information, wherein the MAC control element is indicated by a logical channel identifier (LCID).

Example 8 may include the subject matter of Example 6, wherein the transceiver circuitry is further to report the congestion information via a dedicated RRC message.

Example 9 is an evolved node B (eNB) comprising: transceiver circuitry to: send a reporting-support transmission to a plurality of user equipments (UEs), wherein the reporting-support transmission includes a reporting parameter that indicates that the eNB supports UE-initiated reporting of congestion information; and receive, from each of one or more UEs of the plurality of UEs, congestion information, wherein the congestion information is indicative of an occurrence of one or more congestion events at the one or more UEs; and logic circuitry coupled with the transceiver circuitry, the logic circuitry configured to manage random access requests received from the plurality of UEs based on the congestion information received from the one or more UEs.

Example 10 may include the subject matter of Example 9, wherein the reporting-support transmission further includes one or more additional parameters that define the one or more congestion events.

Example 11 may include the subject matter of Example 10, wherein the one or more congestion events include: a threshold number of unsuccessful attempts to connect with the eNB; or a threshold duration of unsuccessful attempts to connect with the eNB.

Example 12 may include the subject matter of Example 11, wherein the reporting-support transmission is sent as part of a: broadcast control message transmitted by the eNB; or a radio resource control (RRC) message transmitted by the eNB.

Example 13 may include the subject matter of any one of Examples 9-12, wherein the congestion information includes one or more of: a boolean indicator that at least one of the one or more congestion events was detected; an access class identifier that identifies an access class to which the respective UE belongs; a numerical indicator indicating a number of consecutive unsuccessful attempts to connect with the eNB; or a time indicator indicating a duration of consecutive unsuccessful attempts to connect with the eNB.

Example 14 may include the subject matter of Example 13, wherein the transceiver circuitry is further to receive the congestion information via an uplink transmission including: a medium access control (MAC) header that includes the congestion information; or a MAC control element that includes the congestion information, wherein the MAC control element is indicated by a logical channel identifier (LCID).

Example 15 may include the subject matter of Example 13, wherein the transceiver circuitry is further to receive the congestion information via a dedicated RRC message from each of the one or more UEs.

Example 16 may include the subject matter of Example 9, wherein each UE of the plurality of UEs is associated with an access class, and wherein to manage random access requests is to dynamically adjust access class barring parameters to control access requests from an individual UE of the plurality of UEs based on the access class to which the individual UE is associated.

Example 17 may include a method of UE-initiated congestion reporting comprising: sending, by an eNB, a reporting-support transmission to a plurality of user equipments (UEs), wherein the reporting-support transmission includes a reporting parameter that indicates that the eNB supports UE-initiated reporting of congestion information; and receiving, by the eNB, from each of one or more UEs of the plurality of UEs, congestion information, wherein the congestion information is indicative of an occurrence of one or more congestion events at the one or more UEs; and managing, by the eNB, random access requests received from the plurality of UEs based on the congestion information received from the one or more UEs.

Example 18 may include the subject matter of Example 17, wherein the reporting-support transmission further includes one or more additional parameters that define the one or more congestion events.

Example 19 may include the subject matter of Example 18, wherein the one or more congestion events include: a threshold number of unsuccessful attempts to connect with the eNB; or a threshold duration of unsuccessful attempts to connect with the eNB.

Example 20 may include the subject matter of Example 19, wherein the reporting-support transmission is sent as part of a: broadcast control message transmitted by the eNB; or a radio resource control (RRC) message transmitted by the eNB.

Example 21 may include the subject matter of any one of Examples 17-20, wherein the congestion information includes one or more of: a boolean indicator that at least one of the one or more congestion events was detected; an access class identifier that identifies an access class to which the respective UE belongs; a numerical indicator indicating a number of consecutive unsuccessful attempts by the respective UE to connect with the eNB; or a time indicator indicating a duration of consecutive unsuccessful attempts by the respective UE to connect with the eNB.

Example 22 may include the subject matter of Example 21, wherein receiving the congestion information further comprises: receiving the congestion information via an uplink transmission including: a medium access control (MAC) header that includes the congestion information; or a MAC control element that includes the congestion information, wherein the MAC control element is indicated by a logical channel identifier (LCID).

Example 23 may include the subject matter of Example 21, wherein receiving the congestion information further comprises: receiving the congestion information via a dedicated RRC message from each of the one or more UEs.

Example 24 may include one or more computer-readable non-transitory media, having instructions stored thereon, the instructions, in response to execution by an eNB, to cause the eNB to: send a reporting-support transmission to a plurality of user equipments (UEs), wherein the reporting-support transmission includes a reporting parameter that indicates that the eNB supports UE-initiated reporting of congestion information; and receive from each of one or more UEs of the plurality of UEs, congestion information, wherein the congestion information is indicative of an occurrence of one or more congestion events at the one or more UEs; and manage random access requests received from the plurality of UEs based on the congestion information received from the one or more UEs.

Example 25 may include the subject matter of Example 24, wherein the reporting-support transmission further includes one or more additional parameters that define the one or more congestion events.

Example 26 may include the subject matter of Example 25, wherein the one or more congestion events include: a threshold number of unsuccessful attempts to connect with the eNB; or a threshold duration of unsuccessful attempts to connect with the eNB.

Example 27 may include the subject matter of Example 26, wherein the reporting-support transmission is sent as part of a: broadcast control message transmitted by the eNB; or a radio resource control (RRC) message transmitted by the eNB.

Example 28 may include the subject matter of any one of Examples 24-28, wherein the congestion information includes one or more of: a boolean indicator that at least one of the one or more congestion events was detected; an access class identifier that identifies an access class to which the respective UE belongs; a numerical indicator indicating a number of consecutive unsuccessful attempts by the respective UE to connect with the eNB; or a time indicator indicating a duration of consecutive unsuccessful attempts by the respective UE to connect with the eNB.

Example 29 may include the subject matter of Example 28, wherein receiving the congestion information further comprises: receiving the congestion information via an uplink transmission including: a medium access control (MAC) header that includes the congestion information; or a MAC control element that includes the congestion information, wherein the MAC control element is indicated by a logical channel identifier (LCID).

Example 30 may include the subject matter of Example 28, wherein receiving the congestion information further comprises: receiving the congestion information via a dedicated RRC message from each of the one or more UEs.

Example 31 may include a method of UE-initiated congestion reporting comprising: sending, by a UE, a random access channel (RACH) transmission to an evolved node B (eNB) in an attempt to connect with the eNB; and monitoring, by the UE, RACH transmissions from the UE to the eNB to detect one or more congestion events associated with attempts by the UE to connect with the eNB; and initiating, by the UE, in response to detection of at least one of the one or more congestion events, reporting of congestion information to the eNB upon a successful connection with the eNB.

Example 32 may include the subject matter of Example 31, further comprising receiving, by the UE, from the eNB, a reporting-support transmission including a reporting parameter indicating that the eNB supports UE-initiated reporting of congestion information, and wherein initiating reporting of the congestion information is performed only upon receiving of the reporting parameter.

Example 33 may include the subject matter of Example 32, wherein the reporting-support transmission further includes one or more additional parameters that define the one or more congestion events.

Example 34 may include the subject matter of Example 33, wherein the one or more congestion events include a threshold number of unsuccessful connection attempts by the UE or a threshold duration of unsuccessful connection attempts by the UE.

Example 35 may include the subject matter of Example 34, wherein receiving the reporting-support transmission further comprises receiving the reporting-support transmission as part of: a broadcast control message transmitted by the eNB; or a radio resource control (RRC) message transmitted by the eNB.

Example 36 may include the subject matter of any one of Examples 32-35, wherein the congestion information includes one or more of: a boolean indicator that at least one of the one or more congestion events was detected; an access class identifier that identifies an access class to which the UE belongs; a numerical indicator indicating a number of consecutive unsuccessful attempts to connect with the eNB; or a time indicator indicating a duration of consecutive unsuccessful attempts to connect with the eNB.

Example 37 may include the subject matter of Example 36, further comprising reporting the congestion information via an uplink transmission including: a medium access control (MAC) header that includes the congestion information; or a MAC control element that includes the congestion information, wherein the MAC control element is indicated by a logical channel identifier (LCID).

Example 38 may include the subject matter of Example 36, further comprising: reporting the congestion information via a dedicated RRC message.

Example 39 may include one or more computer-readable non-transitory media, having instructions stored thereon, the instructions, in response to execution by an user equipment (UE), to cause the UE to: send a random access channel (RACH) transmission to an evolved node B (eNB) in an attempt to connect with the eNB; and monitor RACH transmissions from the UE to the eNB to detect one or more congestion events associated with attempts by the UE to connect with the eNB; and initiate in response to detection of at least one of the one or more congestion events, reporting of congestion information to the eNB upon a successful connection with the eNB.

Example 40 may include the subject matter of Example 39, wherein the instructions, in response to execution by the UE, further cause the UE to: receive, from the eNB, a reporting-support transmission including a reporting parameter indicating that the eNB supports UE-initiated reporting of congestion information, and wherein to initiate reporting of the congestion information is performed only upon receipt of the reporting parameter.

Example 41 may include the subject matter of Example 40, wherein the reporting-support transmission further includes one or more additional parameters that define the one or more congestion events.

Example 42 may include the subject matter of Example 41, wherein the one or more congestion events include a threshold number of unsuccessful connection attempts by the UE or a threshold duration of unsuccessful connection attempts by the UE.

Example 43 may include the subject matter of Example 42, wherein to receive the reporting-support transmission is to receive the reporting-support transmission as part of: a broadcast control message transmitted by the eNB; or a radio resource control (RRC) message transmitted by the eNB.

Example 44 may include the subject matter of any one Examples 40-43, wherein the congestion information includes one or more of: a boolean indicator that at least one of the one or more congestion events was detected; an access class identifier that identifies an access class to which the UE belongs; a numerical indicator indicating a number of consecutive unsuccessful attempts to connect with the eNB; or a time indicator indicating a duration of consecutive unsuccessful attempts to connect with the eNB.

Example 45 may include the subject matter of Example 44, wherein the instruction, in response to execution by the UE, further cause the UE to: report the congestion information via an uplink transmission including: a medium access control (MAC) header that includes the congestion information; or a MAC control element that includes the congestion information, wherein the MAC control element is indicated by a logical channel identifier (LCID).

Example 46 may include the subject matter of Example 44, wherein the instruction, in response to execution by the UE, further cause the UE to: report the congestion information via a dedicated RRC message.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. A user equipment (UE) comprising:
   transceiver circuitry to:
     receive, from an evolved node B (eNB), a system information block (SIB) having a Boolean reporting parameter that indicates the eNB supports UE-initiated reporting of congestion information; and
     send a random access channel (RACH) transmission to the eNB in an attempt to connect with the eNB; and
   logic circuitry coupled with the transceiver circuitry, the logic circuitry to:
     monitor RACH transmissions from the UE to the eNB to detect one or more congestion events associated with attempts by the UE to connect with the eNB; and
     initiate, based on receipt of the Boolean reporting parameter and detection of at least one of the one or more congestion events, reporting of congestion information to the eNB via the transceiver circuitry upon a successful connection with the eNB,
   wherein the SIB further includes one or more additional parameters that define one or more congestion events for individual access classes of a plurality of access classes, the one or more congestion events to include a threshold number of unsuccessful connection attempts by the UE or a threshold duration of unsuccessful connection attempts by the UE.

2. The UE of claim 1, wherein the congestion information includes one or more of:
   a Boolean indicator that at least one of the one or more congestion events was detected;
   an access class identifier that identifies an access class to which the UE belongs;
   a numerical indicator indicating a number of consecutive unsuccessful attempts to connect with the eNB; or
   a time indicator indicating a duration of consecutive unsuccessful attempts to connect with the eNB.

3. The UE of claim 2, wherein the transceiver circuitry is further to report the congestion information via an uplink transmission including:
   a medium access control (MAC) header that includes the congestion information; or
   a MAC control element that includes the congestion information, wherein the MAC control element is indicated by a logical channel identifier (LCID).

4. The UE of claim 2, wherein the transceiver circuitry is further to report the congestion information via a dedicated radio resource control (RRC) message.

5. An evolved node B (eNB) comprising:
   transceiver circuitry to:
     send, by a system information block (SIB), a reporting-support transmission to a plurality of user equipments (UEs), wherein the reporting-support transmission includes a Boolean reporting parameter that indicates that the eNB supports UE-initiated reporting of congestion information, wherein the SIB further includes one or more additional parameters that define one or more congestion events for individual access classes of a plurality of access classes, the one or more congestion events to include a threshold number of unsuccessful connection attempts or a threshold duration of unsuccessful connection attempts; and
     receive, from each of one or more UEs of the plurality of UEs, congestion information, wherein the congestion information is indicative of an occurrence of at least one of the one or more congestion events at the one or more UEs; and
   logic circuitry coupled with the transceiver circuitry, the logic circuitry configured to manage random access requests received from the plurality of UEs based on the congestion information received from the one or more UEs.

6. The eNB of claim 5, wherein the congestion information includes one or more of:
   a Boolean indicator that at least one of the one or more congestion events was detected;

an access class identifier that identifies an access class to which a respective UE belongs;
a numerical indicator indicating a number of consecutive unsuccessful attempts to connect with the eNB; or
a time indicator indicating a duration of consecutive unsuccessful attempts to connect with the eNB.

7. The eNB of claim 6, wherein the transceiver circuitry is further to receive the congestion information via an uplink transmission including:
  a medium access control (MAC) header that includes the congestion information; or
  a MAC control element that includes the congestion information, wherein the MAC control element is indicated by a logical channel identifier (LCID).

8. The eNB of claim 6, wherein the transceiver circuitry is further to receive the congestion information via a dedicated radio resource control (RRC) message from each of the one or more UEs.

9. The eNB of claim 5, wherein each UE of the plurality of UEs is associated with an access class, and wherein to manage random access requests is to dynamically adjust access class barring parameters to control access requests from an individual UE of the plurality of UEs based on the access class to which the individual UE is associated.

10. A method of UE-initiated congestion reporting comprising:
  sending, by an eNB, a system information block (SIB) having a reporting-support transmission to a plurality of user equipments (UEs), wherein the reporting-support transmission includes a Boolean reporting parameter that indicates that the eNB supports UE-initiated reporting of congestion information, wherein the SIB further includes one or more additional parameters that define one or more congestion events for individual access classes of a plurality of access classes, the one or more congestion events to include a threshold number of unsuccessful connection attempts or a threshold duration of unsuccessful connection attempts;
  receiving, by the eNB, from each of one or more UEs of the plurality of UEs, congestion information, wherein the congestion information is indicative of an occurrence of one or more congestion events at the one or more UEs; and
  managing, by the eNB, random access requests received from the plurality of UEs based on the congestion information received from the one or more UEs.

11. The method of claim 10, wherein the congestion information includes one or more of:
  a Boolean indicator that at least one of the one or more congestion events was detected;
  an access class identifier that identifies an access class to which a respective UE belongs;
  a numerical indicator indicating a number of consecutive unsuccessful attempts by the respective UE to connect with the eNB; or
  a time indicator indicating a duration of consecutive unsuccessful attempts by the respective UE to connect with the eNB.

12. The method of claim 11, wherein receiving the congestion information further comprises: receiving the congestion information via an uplink transmission including:
  a medium access control (MAC) header that includes the congestion information; or
  a MAC control element that includes the congestion information, wherein the MAC control element is indicated by a logical channel identifier (LCID).

13. The method of claim 11, wherein receiving the congestion information further comprises: receiving the congestion information via a dedicated radio resource control (RRC) message from each of the one or more UEs.

14. One or more computer-readable non-transitory media, having instructions stored thereon, the instructions, in response to execution by an eNB, to cause the eNB to:
  send, by a system information block (SIB), a reporting-support transmission to a plurality of user equipments (UEs), wherein the reporting-support transmission includes a Boolean reporting parameter that indicates that the eNB supports UE-initiated reporting of congestion information, wherein the SIB further includes one or more additional parameters that define one or more congestion events for individual access classes of a plurality of access classes, the one or more congestion events to include a threshold number of unsuccessful connection attempts or a threshold duration of unsuccessful connection attempts; and
  receive, from each of one or more UEs of the plurality of UEs, congestion information, wherein the congestion information is indicative of an occurrence of one or more congestion events at the one or more UEs; and
  manage random access requests received from the plurality of UEs based on the congestion information received from the one or more UEs.

* * * * *